July 6, 1943. B. WILLIAMS 2,323,434
MUCKING AND LOADING MACHINE
Filed Oct. 15, 1940 2 Sheets-Sheet 1
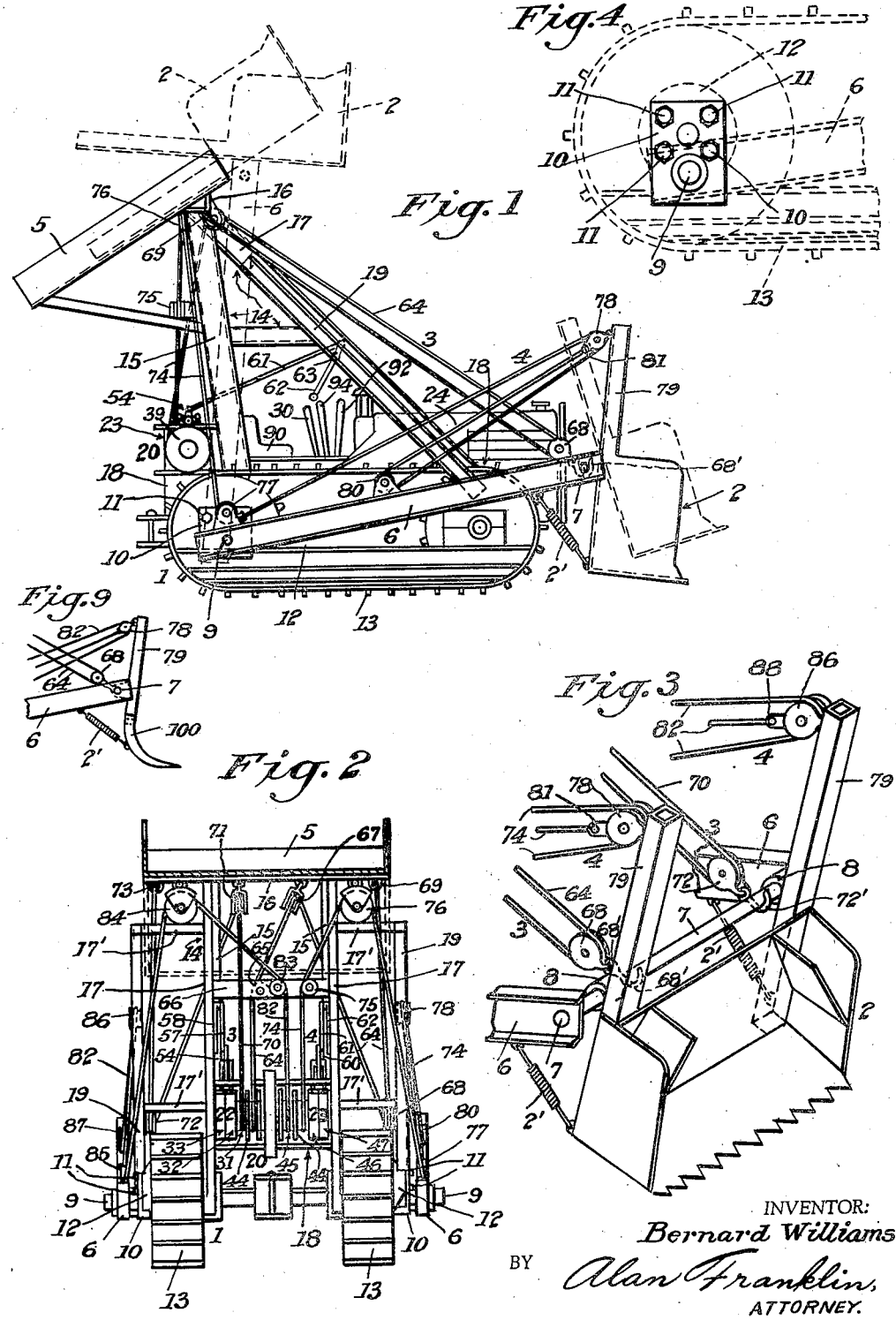
INVENTOR:
Bernard Williams,
BY Alan Franklin,
ATTORNEY.

July 6, 1943.   B. WILLIAMS   2,323,434
MUCKING AND LOADING MACHINE
Filed Oct. 15, 1940   2 Sheets-Sheet 2
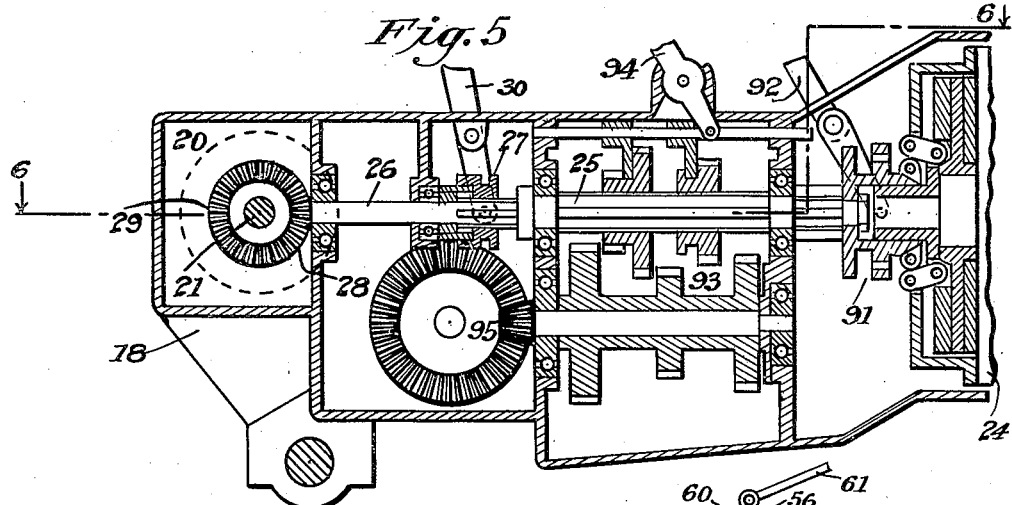
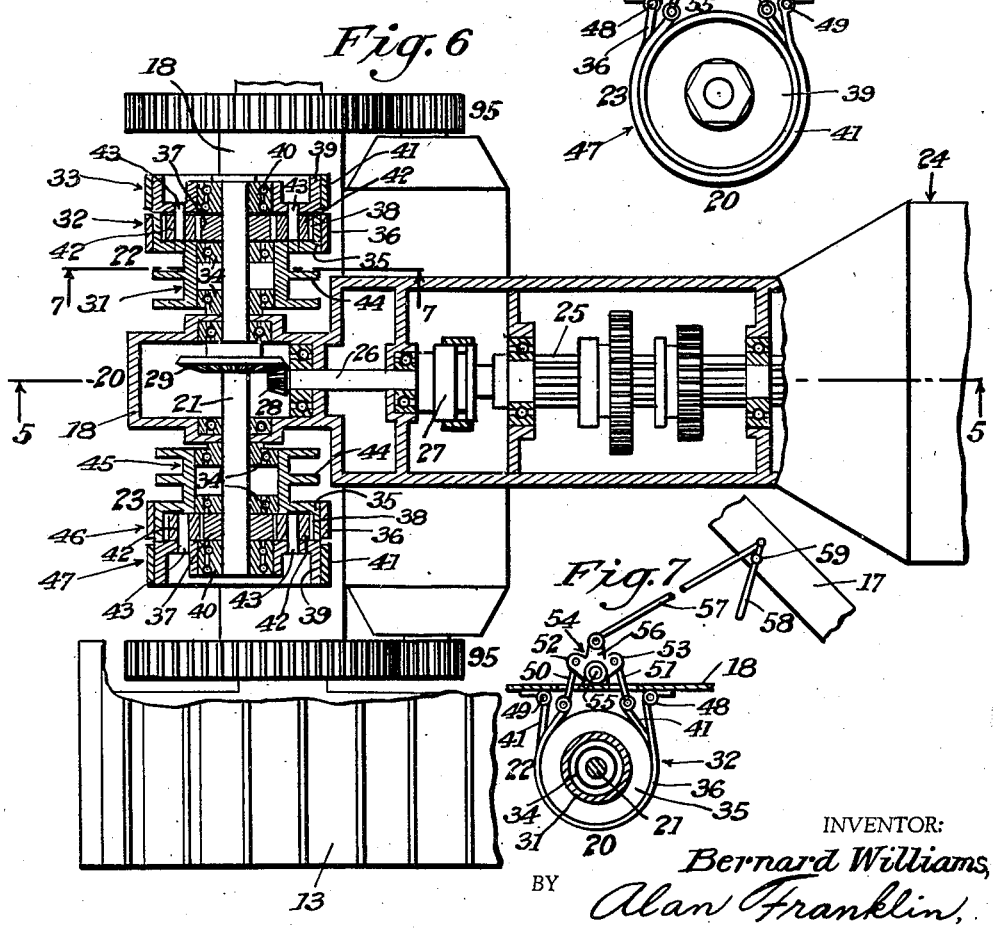
INVENTOR:
Bernard Williams,
BY Alan Franklin,
ATTORNEY.

Patented July 6, 1943

2,323,434

UNITED STATES PATENT OFFICE 2,323,434

MUCKING AND LOADING MACHINE

Bernard Williams, Kanopolis Dam, Kans.

Application October 15, 1940, Serial No. 361,210

1 Claim. (Cl. 214—140)

This invention relates to excavating machines and more particularly to mucking and loading machines, and it is an improvement on the mucking and loading machine disclosed in the patent of Saul Lester Wixson and myself, No. 2,063,214, granted December 8, 1936.

The general object of the invention is to provide a mucking and loading machine of the character stated, which is constructed and arranged to give its shovel an additional forward and upward tilting movement or crowding action at the end of its digging operation, so as to excavate all of the material that the shovel digs.

Other objects and advantages will appear hereinafter.

In this specification and the annexed drawings I disclose my invention in a form which I consider desirable, but I do not limit my invention to such form, because it may be embodied in other forms, and it is to be understood that, in and by the claims of this specification, I intend to cover my invention in whatever form it may be embodied.

In the drawings:

Fig. 1 is a side elevation of my invention, showing, in full lines, the shovel in its lowered and digging position, and in dotted lines the shovel in its additional forward and upwardly-tilted position, while in said lowered position, and showing also, in dotted lines, the shovel in its uppermost and loading position.

Fig. 2 is a rear elevation of my invention.

Fig. 3 is a perspective of the shovel of my invention.

Fig. 4 is a side view of one of the hanger plates on which one of the shovel carrier arms is fulcrummed.

Fig. 5 is a longitudinal section of the tractor transmission and drive mechanism for the power control unit of my invention taken on line 5—5 of Fig. 6.

Fig. 6 is a horizontal section taken on line 6—6 of Fig. 5.

Fig. 7 is a transverse vertical section of the cable drum assembly of the power control unit, for the shovel elevating cable, taken on line 7—7 of Fig. 6.

Fig. 8 is an end view of the cable drum assembly, of the power control unit, for the shovel tilting cable.

Fig. 9 is a fragmentary side view of my invention with a loader for logs and the like.

Referring more particularly to the drawings, in which corresponding parts are designated by the same reference numerals in all of the views, my invention includes generally a tractor 1, a mucking and loading shovel 2, shovel lowering and elevating means 3, shovel tilting means 4 and a loading chute 5, into which the shovel 2, when elevated, discharges the dirt which it has shoveled, for loading a truck positioned under the lower end of said discharge chute.

The shovel 2 is fulcrummed at its rear side on the forward ends of a pair of shovel-carrier arms 6, by means of a shaft 7, secured at its ends in the forward ends, respectively, of said arms 6, and a pair of bearings 8, extending rearwardly from the shovel and turnably fitted on said shaft 7 adjacent the inner sides of said arms 6 respectively. Springs 2' are connected to the lower rear corners respectively of the shovel 2 and to the shovel carrier arms 6 respectively for normally holding said shovel in its digging position. The rear ends of said shovel-carrier arms 6 are fulcrummed on stud shafts 9 outstanding from hanger plates 10 which are bolted by bolts 11 to the outer side frame members 12, respectively, of the tractor 1, which frame members extend along the outer sides of the tractor treads 13 respectively.

On the tractor 1 is mounted a supporting frame 14 on which the loading chute 5 is supported and other elements of my invention are carried, which frame includes a pair of rear uprights 15, beam 16 supported on the upper ends of said uprights upon which beam rests the loading chute 5, and a pair of inclined braces 17, said uprights extending upwardly and slightly rearwardly at an inclination from the rear part of the tractor frame 18, and said braces 17 extending rearwardly and upwardly at an inclination, with their lower ends secured to the forward part of the tractor frame 18 and their upper ends secured to the cross beam 16. A pair of guide beams 19 for the shovel carrier arms 6 are mounted upon the supporting frame 14, adjacent the inner sides of said shovel carrier arms, respectively, said guide beams being secured to the outer ends of arms 17', extending outwardly from said braces 17, respectively, whereby said guide beams are positioned parallel to said braces, to guide said shovel carrier arms, during their swinging movement, up or down, against lateral displacement.

On the rear end of the tractor frame 18 is mounted a power control unit 20 for the shovel 2, which control unit includes generally a horizontal shaft 21, an elevating cable drum assembly 22, and a tilting cable drum assembly 23, operatively mounted on said shaft 21, for respectively elevating and tilting the shovel 2, said shaft 21 being driven by the tractor engine 24 through the medium of the engine power transmission shaft 25, an auxiliary power transmission shaft 26, a clutch 27 for clutching said auxiliary power transmission shaft 26 to the engine power transmission shaft 25, and a bevel pinion 28 on the rear end of said auxiliary power transmission shaft 26 in mesh with a bevel gear 29 on the power control unit shaft 21. The clutch 27 is operated by a lever 30. The elevating cable drum assembly 22 comprises a cable drum 31, a brake 32 and a clutch 33. The drum 31 is rotatably mounted on the shaft 21 by means of ball bearings 34. The brake 32 comprises a brake drum 35 formed integral with the cable drum 31, and a friction brake band 36 surrounding said brake drum. The clutch 33 comprises a gear 37 keyed on the shaft 21, an internal gear 38 in the brake drum 35, a clutch drum 39 rotatably mounted on the shaft 21 by means of ball bearing 40, a friction brake band 41 surrounding said clutch drum 39 and a plurality of planetary pinions 42 journaled on studs 43 secured in the clutch drum 39, which planetary pinions intermesh with the gear 37 and the internal gear 38. The cable drum 31 is formed intermediate its ends with an external annular flange 44 so that two separate cables may be wound on the drum at opposite sides, respectively of said flange. The tilting cable drum assembly 23 comprises a cable drum 45, a brake 46 and a clutch 47, which drum, brake and clutch correspond in detail to the drum 31, brake 32 and clutch 33 respectively, of the elevating cable drum assembly 22. The brake band 36 of the brake 32 and the brake band 41 of the clutch 33, of the elevating cable drum assembly 22, are connected respectively, at one end, at fixed points 48 and 49, to the tractor frame 18, and at their other ends, by links 50 and 51, to arms 52 and 53, respectively, of a three-arm bell crank lever 54, which is fulcrummed at 55 to the tractor frame 18. To the third arm 56 of said bell-crank lever 54 is connected the rear end of a rod 57, which is connected at its forward end to a hand operating lever 58 pivoted at 59 to the inner side of the left inclined brace 17. The brake band 36 of the brake 46 and the brake band 41 of the clutch 47 of the tilting cable drum assembly 23 are also connected respectively, at one end, at fixed points 48 and 49, to the tractor frame 18, and at their other ends, by links 50 and 51, to arms 52 and 53, respectively, of a three arm bell crank lever 60, which is fulcrummed at 55 to the tractor frame 18. To the third arm 56 of bell-crank lever 60 is connected the rear end of a rod 61, which is connected at its forward end to a hand-operating lever 62 pivoted at 63 to the inner side of the right inclined brace 17 of the supporting frame 14.

On the cable drum 31 of the power-control unit 20, at the right side of the drum flange 44, is wound a cable 64, which extends upwardly first over a sheave 65, journaled on a cross bar 66 secured at its ends to the uprights 15, then over a pulley 67, suspended from the cross beam 16, and downwardly and forwardly over a pulley 68, which is hooked by a hook 68' extending from said pulley over the shovel fulcrum shaft 7 adjacent the right shovel carrier arm 6, and then upwardly and rearwardly to the cross beam 16 of the supporting frame 14, to which beam the remote end of said cable 64 is secured at 69. On the cable drum 31, at the left side of the drum flange 44, is wound a cable 70, which extends upwardly over a pulley 71, suspended from the cross beam 16, then downwardly and forwardly over a pulley 72, which is hooked by a hook 72' extending from said pulley over the shovel fulcrum shaft adjacent the left shovel carrier arm 6, and then upwardly and rearwardly to the cross beam 16 to which the remote end of said cable is secured at 73.

On the cable drum 45 of the power control unit 20, at the right side of the drum flange 44, is wound a cable 74, which cable extends upwardly first over a sheave 75, journaled on the cross bar 66; then over a pulley 76 suspended from the cross beam 16; then downwardly and under a pulley 77 mounted on the right shovel carrier arm 6 near the rear end of said arm; then forwardly and upwardly over a pulley 78 connected to an arm 79 extending rearwardly from the right side and at the back of the shovel 2; then rearwardly and downwardly under a pulley 80 mounted on said right shovel carrier arm 6 intermediate the ends of said arm; and then upwardly and forwardly again to the pulley 78, to the block of which pulley the remote end of said cable 74 is connected at 81. On the cable drum 45, at the left side of the drum flange 44, is wound a cable 82, which cable extends upwardly, first over a sheave 83 journaled on the cross bar 66; then over a pulley 84 suspended from the beam 16; then downwardly and under a pulley 85 mounted on the left shovel carrier arm 6 near the rear end of said arm; then forwardly and upwardly over a pulley 86 connected to an arm 79 extending rearwardly from the left side and at the back of the shovel 2; then rearwardly and downwardly under a pulley 87 mounted on said left shovel carrier arm 6 intermediate the ends of said arm; and then upwardly and forwardly again to said pulley 86, to the block of which pulley the remote end of said cable 82 is connected at 88.

The control levers 30, 58 and 62 of the power-control unit 20 are located within reach of the operator of my invention while sitting in the driver's seat 90 of the tractor 1.

In Figs. 5 and 6 are illustrated the tractor engine clutch 91 and its operating lever 92; the tractor transmission gears 93 and gear shift lever 94; and the tractor tread drive mechanism 95, which is driven by the tractor engine 24 through the engine clutch 91, transmission shaft 25 and transmission gears 93.

In Fig. 9 a loader 100 for loading logs and the like is substituted for the shovel 2, which loader is secured to the lower ends of the arms 79.

The operation of my invention is as follows:

The shovel 2 being in its lowermost position, as shown in full lines in Fig. 1 of the drawings, the tractor 1, together with said shovel, is driven forward by the tractor engine 24 until the shovel digs up a load of dirt, whereupon the operator, sitting in the driver's seat 90 of the tractor 1, swings the tractor gear shift lever 94 and shifts the tractor transmission gears 93 into neutral position, as shown in Fig. 5, and brings the tractor to rest, and the operator swings the auxiliary clutch lever 30 to cause the auxiliary clutch 27 to clutch the auxiliary shaft 26 to the engine transmission shaft 25, so that the tractor engine, through the engine transmission shaft 25, auxiliary transmission clutch 27 and shaft 26, bevel pinions 28 and bevel gear 29, will drive the shaft 21, of the power control unit 20, and the gears 37, on said shaft, of the clutches 33 and 47 of the cable drum assemblies 22 and 23, respectively, of said power control unit, and as the gears 37 are thus rotated their planetary pinions 42 will be rotated by said gears, respectively, and said planetary pinions, intermeshing with the internal gears 38 of said clutches 33 and 47, respectively, will be caused to rotate around the axis of the shaft 21 and to rotate the drums 39 of said clutches 33 and 47, respectively, while the cable drums 31 and 45 remain at rest. The operator then swings the lever 62 rearwardly (Figs. 1 and 8), and, through the rod 61 and bell-crank lever 60, the friction band 41 of cable drum assembly 23 is drawn tightly around the drum 39 of clutch 47, whereupon said drum is brought to rest, while the cable drum 45 is rotated by the power control unit shaft 21, through the gear 37, planetary pinions 42 and internal gear 38, of said cable drum assembly 23, and the tilting cables 74 and 82 are wound on the drum 31 of said cable drum assembly, which cables, extending over the pulleys and connected to the shovel arms 79 at 81 and 88, respectively, as above described, swing the shovel 2 forwardly and upwardly into a tilted position, as shown in dotted lines in its lowermost position, in Fig. 1 of the drawings, thus giving the shovel a crowding action at the end of its digging operation, so that the shovel will excavate all of the dirt which it has dug during its forward movement with the tractor. The operator then swings the lever 62 forwardly and, through the rod 61 and bell-crank lever 60, of the cable-drum assembly 23, the friction band 41 is released from the clutch drum 39, while the friction band 36 is drawn tightly around the brake drum 35 of brake 47, whereupon the cable drum 45 is brought to rest, with the shovel 2, held by the cables 74 and 82 in its tilted position, as above described, while the planetary pinions 42, rotated by the gear 37 and intermeshing with the internal gear 38 of clutch 47, are caused to rotate around the axis of the power control unit shaft 21 and likewise to rotate the clutch drum 39 of said cable drum assembly 23. The operator then swings the lever 58 forwardly (Fig. 7), and, through the rod 57 and bell-crank lever 54 of the cable-drum assembly 22, the friction band 41 is drawn tightly around the drum of clutch 47, whereupon said clutch drum is brought to rest, while the cable drum 31 of the cable-drum assembly 22 is rotated by the power-control unit shaft 21, through the gear 37, planetary pinions 42 and internal gear 38 of the cable-drum assembly 22, and the shovel-elevating cables 64 and 70 are wound upon the cable drum 31 of said cable-drum assembly, which cables, extending over the pulleys, as above described and connected to the cross beam 16 at 69 and 73, respectively, elevate the forward ends of the shovel arms 6, and the shovel 2, swinging said arms upwardly on their fulcrums 9 until the shovel is elevated above the forward end of the delivery chute 5, as shown in dotted lines in Fig. 1 of the drawings, at which time the operator swings the lever 58 rearwardly, which, through rod 57 and bell-crank lever 54, releases the friction band 41 from the clutch drum 39 and draws the friction band 36 tightly around the brake drum 35 of the cable-drum assembly 22, whereupon the cable drum 31 of said assembly is brought to rest, while the planetary pinions 42, rotated by the gear 37 and intermeshing with the internal gear 38 of clutch 32, are caused to rotate about the power-control unit shaft 21 and likewise to rotate the clutch drum 39 of said cable-drum assembly 22. The operator again swings the lever 62 rearwardly and the friction band 36 is released from the brake drum 35, while the friction band 41 is drawn tightly around the clutch drum 39 of the cable-drum assembly 23, whereupon the cable drum 45 is again rotated by the power-control unit shaft 21, gear 37, planetary pinions 42 and internal gear 38 of the clutch 47, winding the cables 74 and 82 further upon the drum 45 and swinging the shovel 2 further on its fulcrum 7 until the arms 79 of the shovel are swung down into the upper portion of the delivery chute 5, in which position of the shovel the load of dirt therein is dumped into the upper end of said delivery chute 5 and passes down said chute and is delivered from the lower, rear end of said chute into a truck under said end of said chute. The operator then swings both levers 58 and 62 into neutral position, as shown in Figs. 7 and 8, releasing the friction bands 36 from the brake drums 35, and releasing the friction bands 41 from the clutch drums 39 of the cable-drum assemblies 22 and 23, whereupon the shovel carrier arms 6 and the shovel 2 swing down of their own weight, while the shovel 2 swings rearwardly under the influence of springs 2' on its fulcrum 7 into its digging position, as shown in full lines in Fig. 1 of the drawings.

My invention is especially practical for loading rails, logs, timber, large pipe, structural steel and rock in a quarry where sizing of the material is desired.

I claim:

A mucking and loading machine comprising a tractor, a pair of shovel carrier arms fulcrumed at their rear ends on the rear part of said tractor at the sides respectively of said tractor, a shovel fulcrumed directly upon the forward ends of said arms, a power control unit mounted on said tractor and operated by the motor of said tractor, cables operated by said power control unit for tilting said shovel upwardly and forwardly at the end of its digging operation, when moved forwardly by said tractor, and cables operated by said power control unit for swinging said arms, and said shovel with a load of dirt upwardly and over said tractor to a point where said dirt is discharged from said shovel.

BERNARD WILLIAMS.